United States Patent [19]

Francois et al.

[11] Patent Number: 4,988,882

[45] Date of Patent: Jan. 29, 1991

[54] MONOCRYSTALS OF SILICATES OF LANTHANIDES USABLE AS SCINTILLATORS FOR THE DETECTION OF X AND GAMMA RADIATION

[75] Inventors: Bernard Francois, Voreppe; Monique Navizet, Proveyzieux; Jean-Claude Rebreyend, Villard de Lans; Christophe Wyon, Saint Egreve, all of France

[73] Assignee: Commissariat a l'Energie Atomique, Paris, France

[21] Appl. No.: 369,110

[22] Filed: Jun. 21, 1989

[30] Foreign Application Priority Data

Jul. 6, 1988 [FR] France ................................ 88 09152

[51] Int. Cl.$^5$ ............................................. G01T 1/202
[52] U.S. Cl. ............................ 250/483.1; 252/301.4 F
[58] Field of Search ................ 252/301.4 F; 250/483.1

[56] References Cited

U.S. PATENT DOCUMENTS 4,647,781 3/1987 Takagi et al. ..................... 250/483.1
4,891,520 1/1990 Ishibashi et al. .............. 252/301.4 F

FOREIGN PATENT DOCUMENTS 249660 12/1987 European Pat. Off. ...... 252/301.4 F
3303166 9/1983 Fed. Rep. of Germany .

OTHER PUBLICATIONS

Toropov, "Izvestia Akademia Nauk SSSR", vol. 33, No. 6, pp. 1057–1061, (1969).

Schwarz, "Inorg. Nucl. Chem. Letters", vol. 3, pp. 231–236, 1967.

Lammers et al., "J. Electrochem. Soc.", vol. 134(8A), pp. 2068–2071, 1987.

*Primary Examiner*—Jack Cooper
*Attorney, Agent, or Firm*—Pearne, Gordon, McCoy & Granger

[57] ABSTRACT

The invention relates to monocrystals of silicates of lanthanides usable as scintillators for the detection of X and/or gamma radiation.

The lanthanide silicate complies with formula:

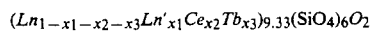

$$(Ln_{1-x_1-x_2-x_3}Ln'_{x_1}Ce_{x_2}Tb_{x_3})_{9.33}(SiO_4)_6O_2$$

in which Ln and Ln', which differ, represent a rare earth element chosen from among La, Gd, Yb and Lu and $x_1$, $x_2$ and $x_3$ are such that $0 \leq x_1 < 1$ $0 \leq x_2 \leq 0.05$ $0 \leq x_3 \leq 0.05$ $0 < x_2 + x_3 \leq 0.1$ $0 < x_1 + x_2 + x_3 < 1$ 9 Claims, 1 Drawing Sheet

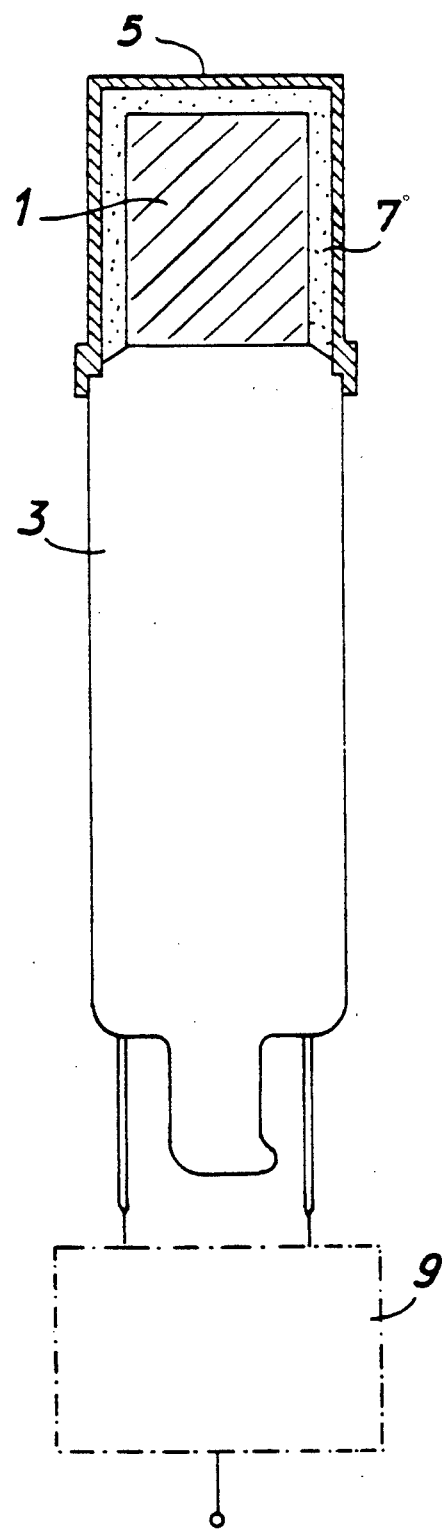

MONOCRYSTALS OF SILICATES OF LANTHANIDES USABLE AS SCINTILLATORS FOR THE DETECTION OF X AND GAMMA RADIATION

The present invention relates to monocrystals of silicates of lanthanides usable as scintillators for the detection of X or gamma radiation. It more particularly relates to the production of scintillators having applications for positron emission tomography in medical imaging or the non-destructive testing of objects, such as nuclear waste containers, as well as in connection with oil prospecting.

A scintillator is a material making it possible to convert a X and/or gamma radiation into a lower energy photon radiation, particularly suitable for the pass band of photomultipliers.

Among the materials usable as scintillators, mixed oxides of silicon have recently been developed and in particular oxyorthosilicates of rare earths of formula:

$$Gd_{2(1-x-y)}Ln_{2x}Ce_{2y}SiO_5$$

in which Ln is Y and/or La and x and y are such that $$0 \leq x \leq 0.5$$

$$1.10^3 \leq y \leq 0.1$$

as described in U.S. Pat. No. 4,647,781.

The performances of such a material can be evaluated on the basis of the following parameters:
 d : material density,
 Z : effective atomic number
 I : scintillation light intensity,
 v : luminescence decay speed.

These parameters make it possible to define the figure of merit $F=dZ^5I/v$.

In this figure of merit F, the value $dZ^5$ characterizes the absorption coefficient of the X and/or gamma radiation and the factor $I/v$ is characteristic of the luminescent ion and the crystallographic environment of said ion.

Scintillators formed from these rare earth oxyorthosilicates give satisfactory results, particularly for applications in positron emission tomography. However, it would be advantageous to further improve their performance characteristics and in particular to obtain a faster luminescence decay and/or a higher emission intensity.

The present invention specifically relates to novel monocrystals of rare earth silicates, usable as scintillators making it possible to obtain improved performances compared with those obtained with the known oxyorthosilicates.

According to the invention, the monocrystal of silicates of lanthanides usable as the scintillator for the detection of X and/or gamma radiation is characterized in that the silicate of lanthanides is in accordance with the formula:

$$(Ln_{1-x_1-x_2-x_3}Ln'_{x_1}Ce_{x_2}Tb_{x_3})_{9.33}(SiO_4)_6O_2$$

in which Ln and Ln', which differ, represent a rare earth element chosen from among La, Gd, Yb and Lu and $x_1$, $x_2$ and $x_3$ are such that $$0 \leq x_1 \leq 1$$

$$0 \leq x_2 \leq 0.05$$

$$0 \leq x_3 \leq 0.05$$

$$0 < x_2 + x_3 \leq 0.1$$

$$0 < x_1 + x_2 + x_3 < 1$$

According to a first embodiment of the invention $x_1$ and $x_3$ are equal to 0. In this case the lanthanide silicate is in accordance with the formula:

$$(Ln_{1-x_2}Ce_{x_2})_{9.33}(SiO_4)_6O_2$$

in which $x_2$ is such that $0 < x_2 \leq 0.05$ and preferably $0.005 \leq x_2 \leq 0.02$.

For example, $x_2$ can range between 0.01 and 0.011, which corresponds to a silicate of formula:

$$Ln_{9.23}Ce_{0.1}(SiO_4)_6O_2$$

These silicates have an emission wavelength of approximately 410 nm at ambient temperature.

According to a second embodiment of the invention $x_1=0$. In this case, the lanthanide silicate is in accordance with formula:

$$(Ln_{1-x_2-x_3}Ce_{x_2}Tb_{x_3})_{9.33}(SiO_4)_6O_2$$

in which Ln represents a rare earth element chosen from among La, Gd, Yb and Lu and $x_2$ and $x_3$ are such that $$0 < x_2 \leq 0.05$$

$$0 < x_3 \leq 0.05$$

preferably such that:

$$0.003 \leq x_2 \leq 0.01$$

$$0.005 \leq x_3 \leq 0.02$$

As examples of rare earth silicates complying with this formula, reference can be made to those for which $x_2$ ranges between 0.005 and 0.006 and $x_3$ ranges between 0.016 and 0.017, like the silicate complying with formula:

$$Ln_{9.13}Ce_{0.05}Tb_{0.15}(SiO_4)_6O_2$$

Due to the simultaneous presence of cerium and terbium, such a rare earth silicate has a higher emission wavelength in the range 500 to 550 nm.

According to a third embodiment of the invention $x_3=0$. In this case, the lanthanide silicate is in accordance with formula:

$$(Ln_{1-x_1-x_2}Ln'_{x_1}Ce_{x_2})_{9.93}(SiO_4)_6O_2$$

in which Ln and Ln', which differ, represent a rare earth element chosen from among La, Gd, Yb and Lu and $x_1$ and $x_2$ are preferably such that:

$0 < x_1 < 1$ $0 < x_2 < 0.05$ $0 < x_1 + x_2 < 1$ and are preferably such that:

$0.05 \leq x_1 \leq 0.2$ $0.005 \leq x_2 \leq 0.02$ $0.055 < x_1 + x_2 < 0.22$

For example, $x_1$ can vary between 0.1 and 0.11 and $x_2$ between 0.01 and 0.011. A silicate of this type complies with formula:

$$Ln_{8.23}Ln'_1Ce_{0.1}(SiO_4)_6O_2$$

According to a fourth embodiment of the invention $x_1$, $x_2$ and $x_3$ are all greater than 0. In this case, $x_1$, $x_2$ and $x_3$ are such that:

$0 < x_1 < 1$ $0 < x_2 < 0.05$ $0 < x_3 \leq 0.05$ and preferably such that:

$0.05 \leq x_1 \leq 0.2$ $0.003 \leq x_2 \leq 0.01$ $0.005 \leq x_3 \leq 0.02$

For example, $x_1$ can vary between 0.1 and 0.11, $x_2$ between 0.05 and 0.06 and $x_3$ between 0.01 and 0.011.
A silicate of this type complies with formula:

$$Ln_{8.18}Ln'_1Ce_{0.05}Tb_{0.1}(SiO_4)_6O_2$$

These silicates also emit in the wavelength range between 500 and 550 nm due to the simultaneous presence of cerium and terbium.

Rare earth silicates activated with cerium and optionally terbium used in the invention are known compounds, which have a structure of the apatite type, as described in the article of J. J. Lammers and G. Blasse published in J. Electrochem Soc.: Solid-State Science and Technology, 1987, pp. 2068-2071. In this article, said silicates are Prepared in the form of powders and their luminescence properties are determined whilst being excited by ultraviolet or X-rays. A study is also performed on terbiumactivated oxyorthosilicate $Gd_2SiO_5$ and the conclusions of said articles show that the silicates according to the invention activated with $Ce^{3+}$ and $Tb_{3+}$ are relatively ineffective as a luminescent material, whereas oxyorthosilicates such as $Gd_2SiO_5$ are excellent.

Thus, it could not be assumed from reading the above article that these monocrystals of these same silicates would have better performances as scintillators than the oxyorthosilicates described in said article and in U.S. Pat. No. 4,647,781.

The monocrystals of silicates of lanthanides according to the invention can be prepared from a lanthanide silicate powder obtained by conventional processes, e.g. by mixing the corresponding oxides $Ln_2O_3$, $Ln'_2O_3$, $CeO_2$ or $Ce_2O_3$, $Tb_2O_3$ and $SiO_2$. After mixing the powders, a heat treatment is carried out, which makes it possible to obtain the lanthanide silicate according to the invention. The temperature used generally exceeds 1000° C. and is chosen as a function of the nature of the constituent oxides and their proportions.

It is also possible to prepare the lanthanide silicate powder by precipitation from soluble compounds of $Ln^{3+}$, $Ln'^{3+}$, $Si^{4+}$, $Ce^{n+}$ with n=3 or 4 and $Tb^{3+}$ in an aqueous or non-aqueous solvent. The salts used can e.g. be acetates and the precipitation can be obtained by adding ammonia. The powder is then transformed into a monocrystal by conventional monocrystal preparation processes and in particular by the Czochralski process. To this end, it is possible to place the powder in a crucible, heat it to the silicate melting or fusion temperature protected from atmospheric oxygen, so as to form a melted bath and prepare a monocrystal from said melted bath by the Czochralski method using a monocrystalline germ of the same composition cut parallel to the crystallographic direction c or to the crystallographic direction a of the hexagonal lattice of the silicate. This germ is brought into contact with the bath and then slowly raised, whilst performing a rotary movement on itself, so as to ensure the progressive growth of the monocrystal at the end of the germ in the direction imposed by it. This method makes it possible to prepare large monocrystals suitable for the scintillator industry.

It is possible to cut a parallelepiped in said monocrystal and then polish the two terminal faces and associate said parallelepiped with a photomultiplier in order to count the number of X and/or gamma photons intercepted by one of the parallelepiped faces.

Thus, the invention also relates to an X and/or gamma ray detector comprising a scintillator constituted by a lanthanide silicate monocrystal according to the invention and a photodetector for detecting the light from the scintillator.

In the monocrystals of silicates of lanthanides according to the invention, it is possible to adapt the scintillator properties and in particular its emission properties by acting on the cerium and possibly terbium quantities added as dopants.

When using cerium alone, the emission of the scintillator takes place at 410 nm and ambient temperature. However, when simultaneously using cerium and terbium, the emission of the scintillator is in the range 500 to 550 nm. In the latter case, the luminescence intensity I is particularly high.

The cerium quantity added influences the luminescence decay speed, which increases with the cerium content and is always higher than that obtained with the oxyorthosilicates of U.S. Pat. No. 4,647,781.

According to the invention, the scintillator properties are also improved by partly substituting the lanthanide Ln by another lanthanide Ln' with a higher atomic number. This makes it possible to increase the effective atomic number Z of the material and its density d, whilst thus improving the X and/or gamma radiation absorption coefficient.

Finally, the silicates used in the invention have the advantage of an apatite-type structure, which remains identical and stable from ambient temperature to the silicate melting temperature, whereas cerium and lanthanum oxyorthosilicates decompose before their melting point. Therefore, the segregation of cerium in the lanthanide silicates according to the invention is less than that observed in oxyorthosilicates. Thus, it is possible to improve the crystalline quality of the samples obtained by the Czochralski method and use larger cerium quantities to increase the luminescence decay rate.

Other features and advantages of the invention can be gathered from studying the following non-limitative examples and with reference to the drawing, which diagrammatically shows an X and/or gamma ray detection apparatus according to the invention.

EXAMPLE 1

Monocrystal of $Gd_{9.28}Ce_{0.05}(SiO_4)_6O_2$

Firstly a mixed oxide powder is prepared from very pure $Gd_2O_3$ $SiO_2$ and $CeO_2$. To this end, into an alumina crucible are introduced 556.99 g of $Gd_2O_3$, 2.86 g of $CeO_2$ and 119.36 g of $SiO_2$ and calcining takes place in air at approximately 1500° C. for 48h, followed by cooling to ambient temperature. The thus obtained silicate powder of formula $Gd_{9.28}CeO_{0.05}(SiO_4)_6O_2$ is then placed in an iridium crucible (diameter 60 mm, height 60 mm) and is then raised to its melting point close to 1900° C. protected from atmospheric oxygen in order to form a melted bath.

A monocrystalline germ of the same lanthanide silicate is then brought into contact with the bath. This germ has been cut parallel to the a crystallographic direction of the hexagonal lattice of the compound. It is then slowly raised, whilst performing a rotary movement on itself. This leads to the formation in progressive manner of the monocrystal at the end of the germ. This gives a homogeneous monocrystal of length 30mm and diameter 70 mm. It then undergoes an annealing treatment at 1200° C. in a hydrogen atmosphere, in order to reduce the tetravalent cerium ions possibly present in the crystal into trivalent cerium ions, which are alone responsible for the scintillation at about 410 nm.

The thus obtained monocrystal has a luminescence decay rate of approximately 30 ns, whereas for the rare earth oxyorthosilicate of U.S. Pat. No. 4,647,781 with the same cerium content, the luminescence decay rate is approximately 60 ns.

EXAMPLE 2

As in example 1, a lanthanide silicate monocrystal of formula $$Gd_{9.23}Ce_{0.1}(SiO_4)_6O_2$$

is formed from 553.91 g of $Gd_2O_3$, 5.72 g of $CeO_2$ and 119.36 g of $SiO_2$. The powder is prepared under the same conditions and is transformed into a monocrystal using the same procedure as in Example 1. The crystal emits at about 410 nm and its luminescence decay speed is approximately 27 ns.

EXAMPLES 3 to 5

Monocrystals of $Ln_{9.23}Ce_{0.1}(SiO_4)_6O_2$ with Ln representing La (example 3), Yb (example 4) and Lu (example 5).

The same operating procedure as in Example 2 is adopted for preparing a lanthanide silicate powder, except that use is made of the following: 498.91 g of $La_2O_3$, 5.72 g of $CeO_2$ and 119.62 g of $SiO_2$ or 645.45 g of $Yb_2O_3$, 6.118 of $CeO_2$ and 127.94 g of $SiO_2$ or 655.25 g of $Lu_2O_3$, 6.14 g of $CeO_2$ and 128.63 g of $SiO_2$.

The monocrystal is then prepared as in example 1 and it undergoes an annealing treatment as in the latter. The monocrystals obtained are all scintillators emitting at about 410 nm and their luminescence decay rate is approximately 40 ns.

EXAMPLE 6

Monocrystal of $Gd_{9.13}Ce_{0.05}Tb_{0.16}(SiO_4)_6O_2$

The same operating procedure as in Example 1 is used, except that there is initially a mixture of powders consisting of 547.91 g of $Gd_2O_3$, 2.86 g of $CeO_2$, 9.09 g of $Tb_2O_3$ and 119.36 g of $SiO_2$. From this powder is then prepared a monocrystal following the same operating procedure as in example 1. The monocrystal then undergoes an annealing treatment at a temperature of 1200° C. in a nitrogen atmosphere for 48 hours. This gives a scintillator emitting at a wavelength of 500 to 550 nm.

EXAMPLES 7 TO 9

As in example 6 monocrystals of $Ln_{9.13}Ce_{0.05}Tb_{0.15}(SiO_4)_6O_2$ are prepared with Ln representing La, Yb or Lu. The monocrystals obtained after annealing emit at a wavelength of 500 to 550 nm.

EXAMPLE 10

The same operating procedure as in Example 1 is adopted for preparing a monocrystal of $Gd_{8.23}LuCe_{0.1}(SiO_4)_6O_2$. Firstly a lanthanide silicate powder is prepared as in example 1 starting with 498.5 g of $Gd_2O_3$, 66.49 g of $Lu_2O_3$, 120.48 g of $SiO_2$, 5.75 g of $CeO_2$.

This is followed by the preparation of a monocrystal from said powder following the same operating procedure as in example 1 and carrying out the annealing at 1200° C. under a hydrogen atmosphere for 48 hours. The monocrystal obtained is a scintillator emitting at a wavelength of approximately 410 nm. Its luminescence decay rate is 35 ns.

EXAMPLES 11 to 13

As in example 9, monocrystals of $Ln_{8.23}Ln'Ce_{0.1}(SiO_4)_6O_2$ with Ln and Ln' representing the lanthanides given in the following Table 1 are prepared. These monocrystals also emit at a wavelength of approximately 410 nm. Their decay rates are given in Table 1.

EXAMPLE 14

The same operating procedure as in example 1 is followed for preparing a monocrystal of $Gd_{8.18}LuCe_{0.05}Tb_{0.1}(SiO_4)_6O_2$. Firstly a lanthanide silicate powder is prepared as in example 1 starting with 495.49 g of $Gd_2O_3$, 66.49 g of $Lu_2O_3$, 2.88 g of $CeO_2$, 9.17 g of $Tb_2O_3$ and 120.48 g of $SiO_2$.

This is followed by the preparation of a monocrystal from the said powder following the same operating procedure as in example 1 and carrying out an annealing treatment at 1200° C. under a hydrogen atmosphere and for 48 hours. The monocrystal obtained is a scintillator emitting at a wavelength in the range 500 to 550 nm.

The monocrystals of silicates of lanthanides according to the invention can be used as scintillators in an X and/or gamma ray detector. Such a detector is diagrammatically shown in the attached drawing.

It can be seen in the drawing that the detector comprises a scintillator (1) and a photodetector (3) for detecting the light from the scintillator. Scintillator (1) is placed in an envelope (5), e.g. made from aluminium and internally covered with a reflective material (7) such as barium sulphate. When the scintillator (1) is irradiated by gamma radiation passing through the aluminium envelope, light is produced by scintillator (3). The emitted light is directed in all directions, but is reflected by reflective material (7) and introduced into the photomultiplier (3). Amplifier (9) amplifies the output of photomultiplier (3). The aforementioned detector can in particular be used for medical imaging by positron emission tomography. In this diagnostic method, positron emitter elements are incorporated in place of natural isotopes in the biological molecules injected into the patient. The presence of these molecules or their metabolites is then tracked in a region of the body by positron emissions and annihilation photons are detected, i.e. gamma rays, using pairs of lanthanide silicate monocrystals according to the invention.

The detector described hereinbefore can also be used in drilling wells for detecting X and/or gamma radiation emitted, following prior irradiation, by the different geological layers, which makes it possible to identify the latter.

Equipment incorporating a scintillator for oil prospecting is e.g. described in European Patent 231693.

TABLE 1

| | 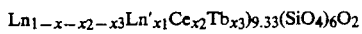$Ln_{8.23}Ln'_1CeO_{0.1}(SiO_4)_6O_2$ | | |
|---|---|---|---|
| Ex | Ln | Ln' | Decay rate (ns) |
| 11 | Gd | Yb | 35 |
| 12 | La | Lu | 40 |
| 13 | La | Yb | 40 |

What is claimed is:

1. An X and/or gamma ray detector comprising a lanthanide silicate monocrystal scintillator and a photodetector for detecting the light coming from the scintillator, characterized in that the monocrystal scintillator has an apatite structure and complies with the formula:

$Ln_{1-x_1-x_2-x_3}Ln'_{x_1}Ce_{x_2}Tb_{x_3})_{9.33}(SiO_4)_6O_2$ in which Ln and Ln', which differ, represent a rare earth element chosen from among La, Gd, Yb and Lu and $x_1$, $x_2$ and $x_3$ are such that $0 \leq x_1 < 1$ $0 < x_2 \leq 0.05$ $0 \leq x_3 \leq 0.05$ $0 < x_2 + x_3 \leq 0.1$ $0 < x_1 + x_2 + x_3 < 1$ 2. A detector according to claim 1, characterized in that $x_1$ and $x_3$ are equal to 0.

3. A detector according to claim 2, characterized in that $0.005 \leq x_2 \leq 0.02$.

4. A detector according to claim 1, characterized in that $x_1$ is equal to 0.

5. A detector according to claim 4, characterized in that $x_2$ and $x_3$ are such that $0.003 \leq x_2 \leq 0.01$ $0.005 \leq x_3 \leq 0.002$ 6. A detector according to claim 1, characterized in that $x_3$ is equal to 0.

7. A detector according to claim 6, characterized in that $x_1$ and $x_2$ are such that $0.05 \leq x_1 \leq 0.2$ $0.005 \leq x_2 \leq 0.02$ with $0.055 \leq x_1 + x_2 \leq 0.22$ 8. A detector according to claim 1, characterized in that $x_1$, and $x_3$ are greater than 0.

9. A detector according to claim 8, characterized in that $x_1$, $x_2$ and $x_3$ are such that:

$0.05 \leq x_1 \leq 0.2$ $0.003 \leq x_2 \leq 0.01$ $0.005 \leq x_3 \leq 0.02$

* * * * *

UNITED STATES PATENT AND TRADEMARK OFFICE
CERTIFICATE OF CORRECTION

PATENT NO. : 4,988,882

DATED : January 29, 1991

INVENTOR(S) : Bernard Francois et al.

It is certified that error appears in the above-identified patent and that said Letters Patent is hereby corrected as shown below:

Column 1, last line, delete "Cd" and insert --Ce--.

Column 2, line 5, delete "$0 \leq x \geq 1$" and insert --$0 \leq x < 1$--.

Column 2, line 18, delete "$9.93$" and insert --$9.33$--.

Column 2, line 63, delete "$x_1 x_2$" and insert --$x_1 - x_2$--.

Column 3, line 25, delete "$0 < x_2 < 0.05$" and insert --$0 < x_2 \leq 0.05$--.

Column 3, line 54, delete "terbiumactivated" and insert --terbium-activated--.

Column 5, line 67, delete "6.118" and insert --6.11 g--.

Column 7, Table 1, line 30, delete "$CeO_{0.1}$" and insert --$Ce_{0.1}$--.

Column 7, last line, delete "$Ln_1-x-$" and insert --$Ln_1-x_1-$--.

UNITED STATES PATENT AND TRADEMARK OFFICE
CERTIFICATE OF CORRECTION

PATENT NO. : 4,988,882

DATED : January 29, 1991

INVENTOR(S) : Bernard Francois, et al.

It is certified that error appears in the above-identified patent and that said Letters Patent is hereby corrected as shown below:

Column 7, last line, delete "$Ln_1-x-$" and insert --$Ln_1-x_1-$ --.

Signed and Sealed this

Twenty-third Day of June, 1992

Attest:

DOUGLAS B. COMER

*Attesting Officer*     *Acting Commissioner of Patents and Trademarks*